US008126746B2

(12) United States Patent
Harris et al.

(10) Patent No.: US 8,126,746 B2
(45) Date of Patent: Feb. 28, 2012

(54) SYSTEM AND METHOD FOR PROCESSING AND ADMINISTERING FLEXIBLE GUARANTEED INCOME PAYMENTS

(75) Inventors: Patricia L. Harris, Burlington, CT (US); Stephen T. Joyce, West Hartford, CT (US); Ken A. McCullum, Simsbury, CT (US); Richard P. Rubin, Avon, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 505 days.

(21) Appl. No.: 12/335,742

(22) Filed: Dec. 16, 2008

(65) Prior Publication Data

US 2009/0094070 A1 Apr. 9, 2009

Related U.S. Application Data

(63) Continuation-in-part of application No. 11/654,489, filed on Jan. 17, 2007, now Pat. No. 8,010,388.

(60) Provisional application No. 60/778,477, filed on Mar. 2, 2006, provisional application No. 61/188,963, filed on Aug. 14, 2008.

(51) Int. Cl.
*G06Q 40/00* (2006.01)
(52) U.S. Cl. .............................. 705/4; 705/5; 705/36 R
(58) Field of Classification Search ............... 705/4, 35, 705/36 R
See application file for complete search history.

(56) References Cited

U.S. PATENT DOCUMENTS

| 5,655,085 | A | 8/1997 | Ryan et al. | |
|---|---|---|---|---|
| 5,907,828 | A * | 5/1999 | Meyer et al. | 705/4 |
| 6,085,174 | A | 7/2000 | Edelman | |
| 6,611,815 | B1 | 8/2003 | Lewis et al. | |
| 6,636,834 | B1 | 10/2003 | Schirripa | |
| 7,089,201 | B1 | 8/2006 | Dellinger et al. | |
| 7,120,601 | B2 | 10/2006 | Chen et al. | |
| 7,376,608 | B1 | 5/2008 | Dellinger et al. | |
| 2002/0120474 | A1* | 8/2002 | Hele et al. | 705/4 |
| 2004/0172304 | A1 | 9/2004 | Joao | |
| 2005/0055249 | A1 | 3/2005 | Helitzer et al. | |

(Continued)

FOREIGN PATENT DOCUMENTS

WO 2004013794 A2 2/2004

OTHER PUBLICATIONS

International Search Report dated Sep. 26, 2007.

(Continued)

*Primary Examiner* — Jagdish Patel
*Assistant Examiner* — Kevin Poe
(74) *Attorney, Agent, or Firm* — Howard IP Law Group, PC

(57) ABSTRACT

A system is provided for administering fixed income immediate and deferred payments in any of a plurality of different payout schemes selected by a purchaser to accommodate varying retirement income needs. The system can be configured to administer an immediate income annuity where payments start within one year and the system can also administer a deferred payout annuity through a single dual natured payout contract. Additional options available for administration by the system include options to permit the contract owner to change the annuity commencement date and the ability to commute future period certain periodic payments into a single lump sum payment.

20 Claims, 5 Drawing Sheets

U.S. PATENT DOCUMENTS

| | | |
|---|---|---|
| 2005/0060209 A1* | 3/2005 | Hill et al. ............................ 705/4 |
| 2005/0060251 A1 | 3/2005 | Schwartz et al. |
| 2006/0041455 A1* | 2/2006 | Dehais ................................ 705/4 |
| 2006/0106698 A1* | 5/2006 | Mahaney et al. ................. 705/35 |
| 2006/0111998 A1* | 5/2006 | Fisher et al. ...................... 705/35 |
| 2006/0149651 A1 | 7/2006 | Robinson |
| 2007/0011063 A1 | 1/2007 | Shelon et al. |
| 2007/0100727 A1* | 5/2007 | Multer et al. ................. 705/36 R |
| 2007/0106589 A1 | 5/2007 | Schirripa |
| 2008/0133278 A1 | 6/2008 | Stanfield |
| 2009/0132430 A1* | 5/2009 | Weiss ............................ 705/36 R |
| 2010/0153140 A1 | 6/2010 | Helitzer et al. |
| 2011/0077979 A1* | 3/2011 | Mercier et al. ..................... 705/4 |
| 2011/0131152 A1* | 6/2011 | Golembiewski ............ 705/36 R |

OTHER PUBLICATIONS

International Search Report dated Mar. 20, 2009.

* cited by examiner

SYSTEM AND METHOD FOR PROCESSING AND ADMINISTERING FLEXIBLE GUARANTEED INCOME PAYMENTS

CROSS-REFERENCE TO RELATED APPLICATIONS

This application is a continuation-in-part of copending U.S. patent application Ser. No. 11/654,489, filed Jan. 17, 2007, which claims the benefit of U.S. Provisional Application No. 60/778,477, filed Mar. 2, 2006, the entire contents of both of which applications are herein incorporated by reference. This application also claims the benefit of U.S. Provisional Application No. 61/188,963 filed Aug. 14, 2008, the entire contents of which is herein incorporated by reference.

FIELD OF THE INVENTION

The present invention generally relates to the field of financial services computer systems, and particularly to computer systems for administering guaranteed income payments.

BACKGROUND OF THE INVENTION

Traditional lifetime retirement income sources such as social security and pensions are playing an increasingly smaller role in modern retirement income planning and strategies. As the level of benefits provided under once robust pensions plans dwindle and the stability of the social security system itself is questioned, other sources of retirement income have become increasingly more important. Furthermore, coupled with longer lifespans, continued inflation and financial markets volatility, retirement poses many challenges for current generations. An increasing concern of many retirees (and those approaching retirement) is the possibility of outliving one's assets.

Guaranteed income annuities can overcome many of these retirement challenges and provide security and certainty for individuals. By providing lifetime or period certain streams of guaranteed income, (or a combination of both these income annuities can meet many post retirement income needs and assure retirees of guaranteed income to support their lifestyles. Current variations of guaranteed income annuities are offered as either a separate immediate annuity or as a separate deferred annuity. Immediate annuities have periodic annuity payments that begin within one year of the purchase date of the annuity contract. In contrast, deferred annuities have payments that begin more than 12 months after purchase of the annuity contract, and in one manifestation (longevity insurance which defers payouts to an age at or around life expectancy) can provide a useful backstop to the investment strategy of a retiree Currently, in order to compare the relative benefits of an immediate to that of a deferred annuity, an agent would have to view illustrations from two separate and distinct annuity products. This is primarily due to the fact that conventional deferred annuities must meet complex state insurance laws and special distribution requirements given the delayed aspect of the payout stream. These stringent requirements are similar to other accumulation-type annuities with account balances that have not been annuitized, e.g., variable annuities which offer a variety of mutual fund and equity investment accounts (which only allow annuitization to begin at the time of election), fixed annuities and modified guaranteed annuities. On the other hand, immediate payout annuities are exempt from both the state insurance nonforfeiture laws and the distribution ownership limitations. Such disparate regulatory treatment has made these types of annuities difficult for consumers to compare, contrast and actually benefit from since each has to be modeled and purchased separately.

Accordingly, it would be desirable to have a system which could offer and administer a guaranteed income product with both the benefits of both immediate and deferred annuities as well as offering consumer greater flexibility with respect to the payments to be made and permitting the insurance agent to easily provide a potential consumer with a broad range of income annuity options in a concise manner of comparison.

SUMMARY OF THE INVENTION

The present invention relates to a computer system for processing a guaranteed income annuity having both immediate and deferred payout options in a single guaranteed income contract. The system includes a communications component adapted to receive information relating to the immediate and deferred payout options in the single contract, wherein the information further includes at least a contract issue date, a commencement date and an amount of an initial premium. The system further includes a processor coupled to the communications component, the processor adapted to process the information including at least the contract issue date, the commencement date and the amount of the initial premium, a memory in communication with the processor, the memory adapted to store the contract issue date, the commencement date and the amount of the initial premium, the processor further adapted to determine one or more payment amounts based on the stored contract issue date, commencement date and amount of an initial premium, the memory further adapted to store the determined payment amounts; and the processor further adapted to provide an output signal indicative of instructions for one or more payments to be made based on the stored payment amounts, wherein the payments may be either immediate or deferred arising out of the single guaranteed income contract.

One embodiment of the present invention is a system for providing and administering a flexible guaranteed income annuity which allows a contract owner to either select immediate annuity payments or defer annuity payments for a later date. The system administers a base annuity contract which constitutes an immediate annuity and through a deferred annuity commencement rider, the annuity contract becomes a deferred payout annuity, thus enabling a single contract form to satisfy the entire spectrum of income or payout annuities that would be used for retirement income planning. The system is further adapted to administer an optional annuity commencement date change rider that under certain circumstances allows the contract owner to make a one-time change to the annuity commencement date. The system is also adapted to administer an optional annuity commutation rider that permits the to commute certain types of any benefits into a single lump sum cash payment equal to the present value of the commuted annuity payments.

Another embodiment of the present invention is a system for administering an individual fixed payout annuity product is provided and comprises an electronic communication device for receiving information for the payout annuity, where the information includes an annuity commencement date from a selection of immediate and deferred options, an issue date and an annuity payment option. A computer is coupled to the electronic communication device for receiving a premium payment. The computer is utilized for determining the annuity payment option selected and for calculating guaranteed periodic annuity payments having the annuity commencement date. The computer is also used for modifying guaranteed periodic annuity payments based on one or more commutation options.

In one embodiment, the present invention is a computer implemented method for administering a fixed payout annuity product having immediate and deferred options available in a single contract. In this embodiment, the method comprises the steps of receiving, via an electronic communication device, information for the fixed payout annuity having immediate and deferred options, the information including an annuity commencement date from a selection of both immediate and deferred options in a single contract, an issue date, annuitant information and an annuity payment amount, storing in a storage device, the annuity commencement date, the issue date, the annuitant information and the annuity payment amount, calculating in a computer central processing unit, a stream of guaranteed periodic annuity payments based on the stored annuity commencement date, the issue date and the annuity payment amount, and generating indicia indicative of payment based on the calculated payment amounts, the payment amount reflecting either an immediate or a deferred payout scenario arising out of the single contract.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

DETAILED DESCRIPTION OF THE PREFERRED EMBODIMENT

A detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific functional details disclosed herein are merely representative, yet in that regard, they are deemed to afford the best embodiment for purposes of disclosure and to provide a basis for the claims herein which define the scope of the present invention.

Moreover, well known methods and procedures for both carrying out the objectives of the present invention and illustrating the preferred embodiment are incorporated herein but have not been described in detail as not to unnecessarily obscure novel aspects of the present invention.

None of the terms used herein, including "annuity", "payout contract", "financial vehicle" and the like are meant to limit the application of the invention. The terms are used interchangeably for convenience and are not intended to limit the scope of the invention. Similarly, the use of the term "consumer", "company", "purchaser", or "individual" is not meant to limit the scope of the invention to one type of entity, as any entity or individual can utilize the present invention. The following presents a detailed description of a preferred embodiment of the present invention.

Figure 1:
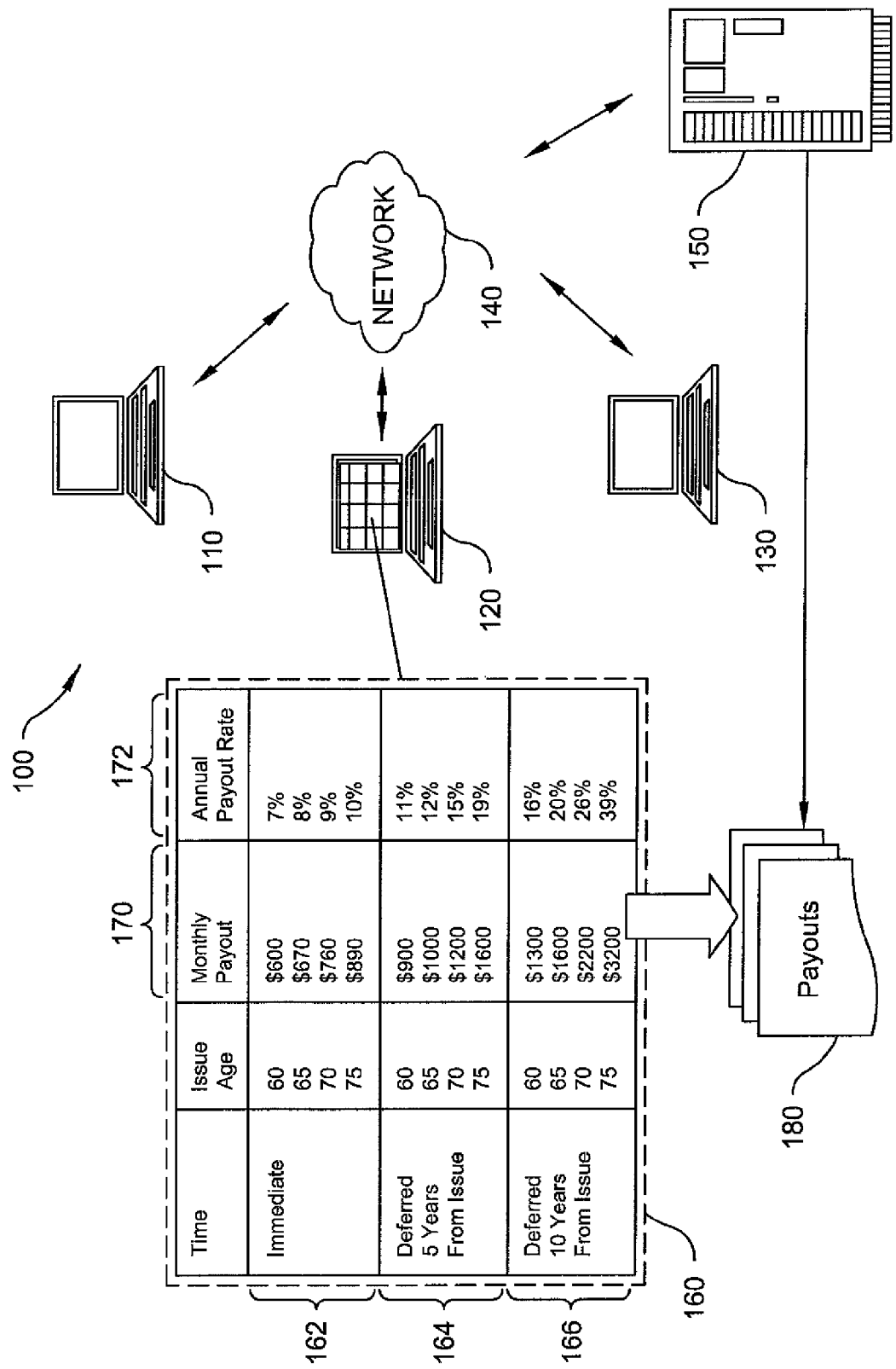
FIG. 1 is a schematic diagram of an exemplary financial services computer configuration for implementation of a method and system of the present invention.

Referring now to FIG. 1, a schematic diagram of a client/agent server arrangement 100 for implementation of a method and system for processing and administering flexible guaranteed payments or payouts in accordance with an embodiment of the invention is shown. The present invention provides a dual natured fixed income annuity product which combines the best features of both immediate and deferred payouts in a single form. In the arrangement 100 of FIG. 1, financial service client/agent devices 110, 120, and 130 are in communication via a network 140 with at least one financial services information technology server 150. In one implementation, client/agent devices 110, 120 and 130 may be computer terminals or personal computers running an operating system such as Windows XP, Windows Vista, Apple OS, UNIX, LINUX, thin client devices, portable devices such as personal digital assistants (running the Palm OS, by way of example), cell phones, or other devices. Client/agent devices 110, 120 and 130 may be operated by individual prospective contract purchasers, annuitants, broker dealers, agents or other financial advisors, or by personnel of an insurance service provider. Network 140 may be or include the Internet, a corporate intranet, wireless and wired communications channels, or other subnetworks, network nodes or locations.

Client/agent devices 110, 120, and 130 are adapted to receive, process, display and communicate information related to a guaranteed income product 160 having the benefits and features of both an immediate and a deferred guaranteed income annuity wrapped into a single contract form. In one embodiment, representative client/agent device 120 is adapted to display, receive and process information regarding guaranteed income product 160. This enables the agent to illustrate the entire range of benefit options over the client's retirement horizon in a single tool and a prospective purchaser to easily see the range of benefit options in a single view. As shown in FIG. 1, product 160 is represented visually by an immediate payout scenario 162 and at least one deferred payout scenario 164. Guaranteed income product 160 provides purchasers with the certainty of income payments in the manner designated and selected by the purchaser via system 100. Guaranteed income product 160 provides the purchaser the flexibility to take income immediately by selecting the immediate payout scenario 162 or delay payments for several years by selecting one of the deferred payout scenarios, 164, 166. Referring still to FIG. 1, it can be seen that depending on how close to retirement the potential purchaser is, an immediate monthly payout can be realized or a deferred payout may be realized, with the result that deferring income has the potential to increase future payments such as shown in deferred payout scenarios 164, 166. For example, under the exemplary monthly payout section 170, it is shown how the monthly payout amounts increase over time corresponding to an increasing annual payout rate in section 172. The specific ages, payout, and rate shown are only for illustrative purposes and are not intended to limit the scope of the invention to the specific figures shown.

Referring still to FIG. 1, server 150 directs the selected payouts streams 180 to one or more recipients. Server 150 may initiate a signal to a financial institution, bank, or other account of the recipient for the payout stream 180. Server 150 may also be configured to direct the printing of a check or other financial mechanism for accomplishing the payment. These payments provide substantial benefits to the recipients. For example, such payments can provide security to cover specific, essential expenses during retirement years; purchasers can avoid being a financial burden on their children; purchasers can satisfy regulatory required minimum distribution requirements; purchasers pass an estate on to heirs or reduce estate taxes; purchasers can receive temporary income until Social Security or other retirement income begins; purchasers can spread out tax liability on a highly appreciated asset; purchasers can pay long-term care insurance policy premiums; and purchasers can simply cover day to day living expenses as well as receive other substantial benefits.

Figure 2:
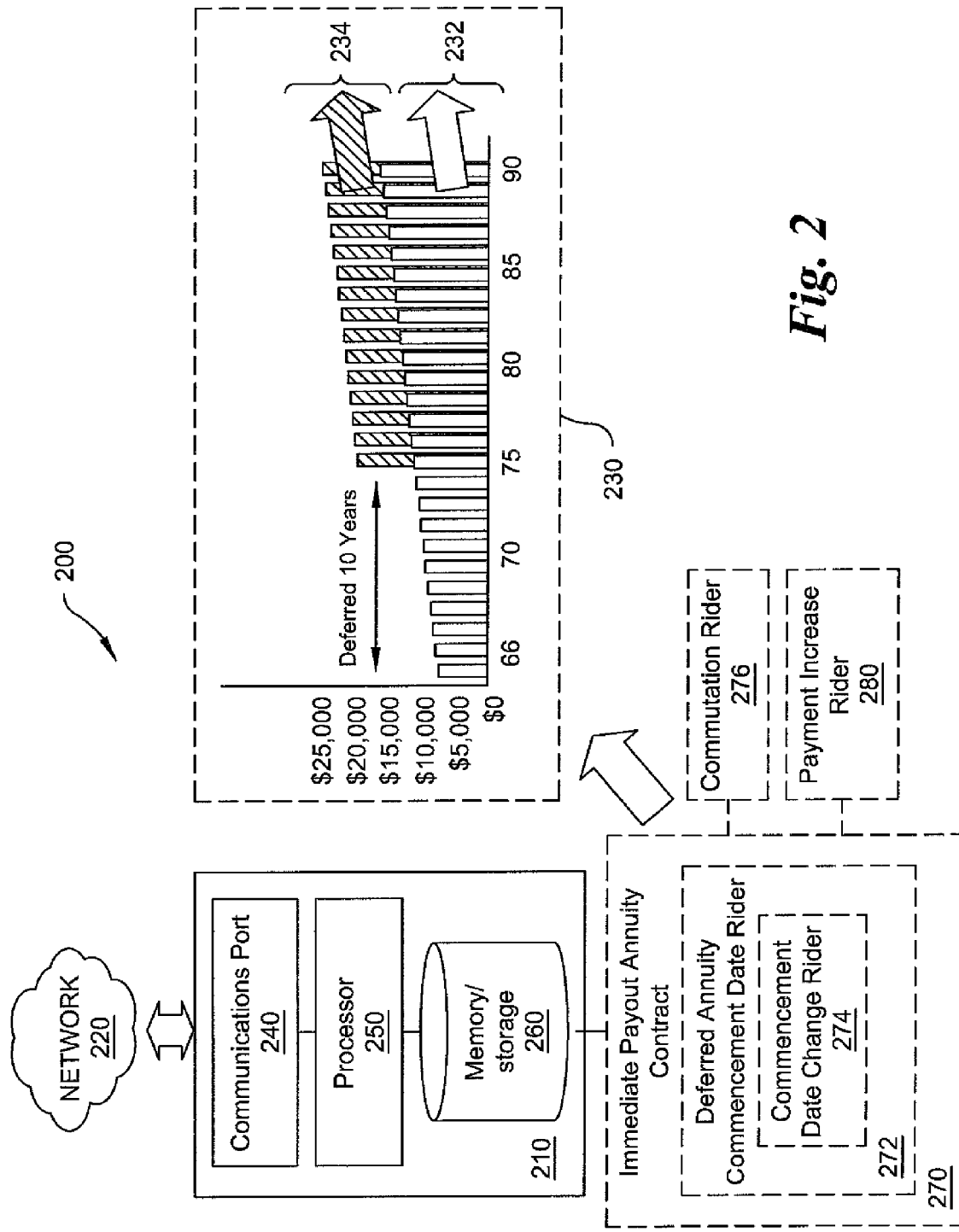
FIG. 2 is a schematic diagram of an exemplary financial services computer server for implementation of a method and system of the present invention.

Referring to FIG. 2, an exemplary computer server and network configuration 200 for use in the implementation of the present invention will now be described. Computer server 210 is adapted for financial services related communications via a network 220 for processing and administering a novel guaranteed income product 230 as described herein. Server 210 communicates via a communications port or module 240, such as through suitable buses, ports and other data channels using appropriate bandwidths, frequencies and protocols as required to securely transmit and receive such financial services related information. Communications port 240 is coupled to a processor 250 which is adapted to handle financial services related communications, processing and calculations. The terms "connected" and "coupled" are used broadly and encompass both direct and indirect connecting, and coupling. Further, "connected" and "coupled" are not restricted to physical or mechanical connections or couplings. Processor 250 is further adapted to execute instructions contained in one or more programs which implement methods and processes described herein to process and administer guaranteed income product 230. Server 210 further includes at least one local memory/storage 260 which is adapted to store financial services related information related to guaranteed income product 230. Such information may include one or more of a contract owner identity, the identity of the annuitant and/or joint annuitant, a beneficiary/recipient identity, a contact issue date, a annuity commencement date, a premium amount, and a number of various payout options which may be selected by the contract owner. This information may be processed and stored by server 210 for initial and ongoing setup, administration and maintenance.

In one embodiment of the present invention, local memory/storage 260 is configured to exchange data with processor 250, and may store programs containing processor-executable instructions, and values of variables for use by such programs for the processing and administration of one or more financial services products such as product 230. Product 230 is shown graphically with exemplary immediate payout stream 232 and deferred payout stream 234 available within a single product 230. In this graphical illustration, if a hypothetical purchaser invests X amount of dollars into product 230 and chooses an immediate payout scenario with a certain guaranteed annual payment increase to help protect against inflation, the purchaser would receive immediate payout stream 232 over their lifetime. On the other hand, if the same purchaser elected to receive deferred annuity payments the purchaser would receive deferred payout stream 234 over the rest of their lifetime. Deferred payout stream 234 is an increased payout stream compared to immediate payout stream 234. As shown, the exemplary payment levels, age and deferral periods are only for illustrative purposes, and it is contemplated that these may fluctuate according to each purchaser's circumstances, family situation and needs.

Referring still to FIG. 2, server 210 is adapted to receive, process and store certain purchaser specified parameters such as the basic annuity payout option, the annuitant (and, if applicable, the joint annuitant), the amount of the annuity payment, and the payment frequency and the date on which payments are to commence, which is referred to herein as the "annuity commencement date." These parameters are generally specified at contract signing and may be received via communications port 240 and stored within memory 260. If the annuity commencement date specified is more than twelve months from the date of purchase, a deferred annuity commencement date rider 272 is included with the base immediate payout contract 270 and information regarding the deferred annuity commencement date rider 272 is stored within server 210. Deferred annuity commencement date rider 272 contains provisions to comply with state insurance laws applicable to deferred annuities such as annuity non-forfeiture laws and other federal laws. The annuity commencement date may be a date certain, a date when an individual such as an annuitant reaches a certain age, or a date a certain period of time after a contract issue date.

In the present invention, the use of deferred annuity commencement date rider 272 in conjunction with the base immediate payout contract 270 provides advantageous flexibility to product 230. Deferred annuity commencement date rider 272 allows the use of the variety of annuity payout options previously not associated with current variations of immediate income annuities. Further, it allows the embodiment of a diverse, all-encompassing single product, by offering these various options in a single product that spans the entire retirement spectrum. For example, product 230 will cover the retirement needs of a diverse group, e.g.: (1) a 55-year-old early retiree who wants to have a short-term supplement to his pension until he begins to receive social security, (2) a 65-year-old retiree who wants additional pension-like income to add to, a pension and social security "base" of retirement income, and (3) a retiree who is planning on using a retirement account balance to fund his retirement but is concerned about outliving his assets and who buys a deferred life-only longevity annuity starting at age 85. It will be appreciated that the payments may be either immediate or deferred arising out of the single guaranteed income product 230, and that the single guaranteed income product 230 is expressed as an immediate base contract form, i.e., immediate payout annuity contract, and a deferred rider, i.e., deferred annuity commencement date rider 272, coupled to the immediate base contract form. The single guaranteed income product 230 may also be understood to be an example of a contract having an immediate base contract and a deferred rider.

Referring still to FIG. 2, contract 270 may include optional annuity commencement date change riders 274 and/or commutation rider 276. With respect to the benefit option to which the annuity commencement date change rider 274 applies, the contract owner may elect to either begin annuity payments earlier or defer the annuity commencement date to a time other than the annuity commencement date selected at the time of purchase. However, the right to accelerate or defer the date annuity payments commence only becomes available after the contract has been in effect for one year. Also, in certain instances the contract owner may commute, e.g.

receive a present value for a future stream of payment, for the remaining period certain annuity payments through the commutation rider. The request to commute can be made six months after the start of annuity payments under either the immediate or deferred scenario. Certain minimum notice or qualification periods may be implemented before a request for an annuity commencement date change or a request for commutation can be accepted.

In other non-limiting embodiments, immediate payout annuity contract 270 may have an optional annuity payment increase rider 280 which is administered by server 210. The optional annuity payment increase rider 280 provides for increased annuity payments at an annual rate. By selecting the annuity payment increase rider 280 at time of purchase, annuity payments will increase on a periodic basis, such as each year, by the percentage preselected by the contract owner, starting on the first anniversary of the annuity commencement date. The annual percentage increase may be selected in the range of 0.5% to six or more percent. If the annuity payment is reduced upon the death of the annuitant (or death of the joint annuitant, if applicable), subsequent increases will be based on the reduced annuity amount. Initially, income payments will be lower when selecting this option compared to level income payments. However, over time, the income payments will be higher than they would be with level payments unless payments cease, such as will be the case for a period certain payout option.

Figure 3:
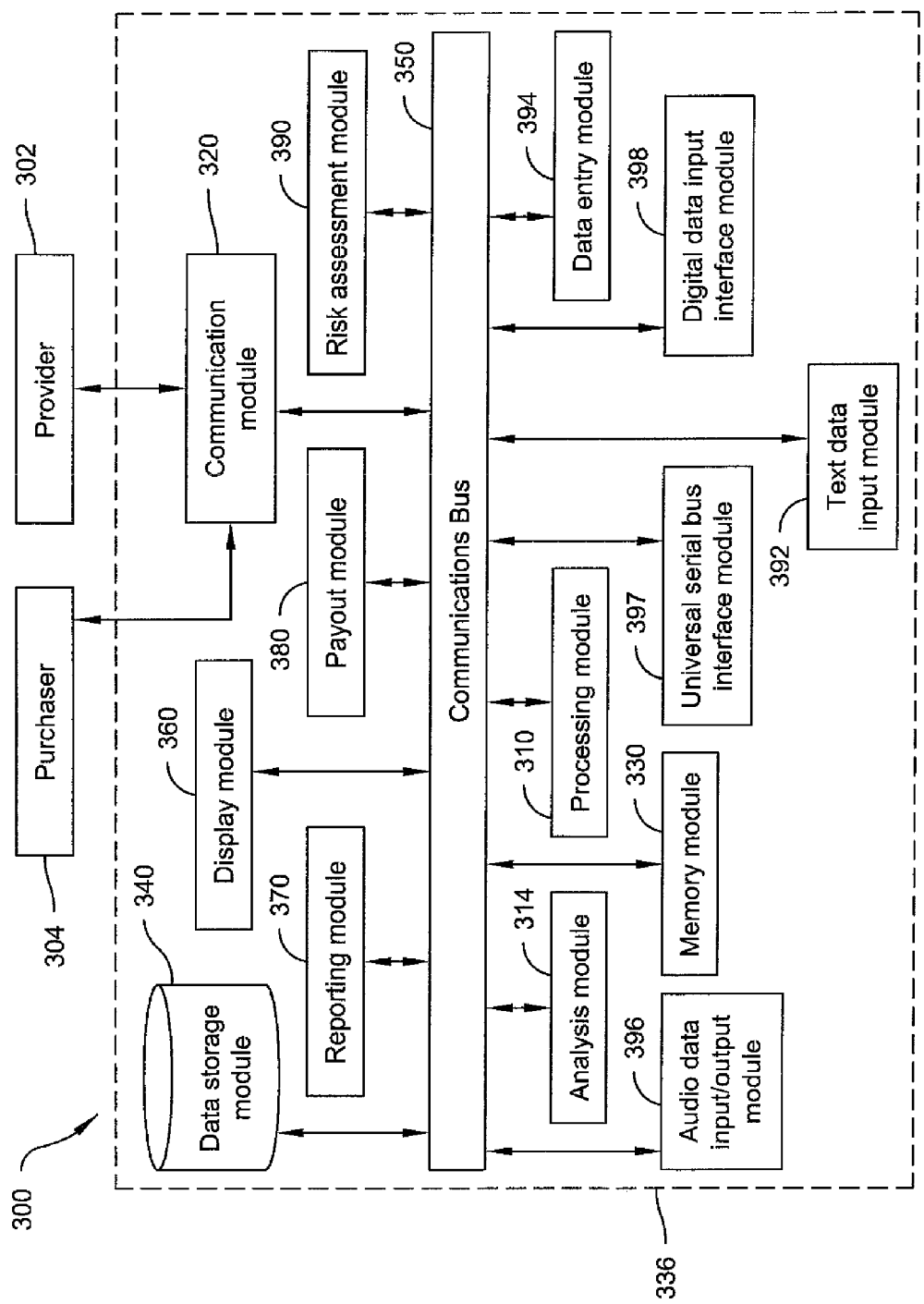
FIG. 3 is a schematic diagram of another exemplary financial services computer system for implementation of a method and system of the present invention.

FIG. 3 depicts another embodiment of a system 300 in which the present invention may be implemented for providing and administering a novel guaranteed income product which is offered as both an immediate payout option and a deferred payout option within the same product and offered by a provider 302 to a purchaser 304. System 300 includes at least one controller or processing module 310 (CPU or processor), at least one communication module 320 port or hub, at least memory module 330 including at least one random access memory module (RAM), at least one read-only memory module (ROM) and one or more databases or data storage modules 340. All of these latter elements are in communication with the processing module 310 to facilitate the operation of the network server. The network server may be configured in many different ways. For example, the network server may be a conventional standalone server computer or alternatively, the function of the server may be distributed across multiple computing systems and architectures.

The network server may also be configured in a distributed architecture, wherein databases and processing modules are housed in separate units or locations. Some such servers perform primary processing functions and contain at a minimum, a RAM, a ROM, and a general controller or processing module. In such an embodiment, these servers are attached to a communications module or port that serves as a primary communication link with other servers, clients or user computers and other related devices. The communications module or port may have minimal processing capability itself, serving primarily as a communications router. A variety of communications protocols may be part of the system, including but not limited to: Ethernet, SAP, SAS, ATP, Bluetooth, GSM and TCP/IP.

Data storage module 340 may include a hard magnetic disk drive, optical storage units, CD-ROM drives, or flash memory. Data storage module 340 contains databases used in processing transactions and/or calculations in accordance with the present invention for payout of the immediate and deferred payments, including at least a participant or purchaser database and a payout annuity database. In one embodiment, database software creates and manages these databases. Payout and commutation calculations and/or algorithms of the present invention are stored in the data storage module 340 and executed by the processing module 310.

The processing module 310 may comprise a processor, such as one or more conventional microprocessors and possibly one or more supplementary co-processors such as math co-processors. The processing module 310 is in communication with communication module 320 through which the processor communicates with other devices such as other servers, user terminals or devices which may be operated by annuitants, agents, purchasers and other parties. In other non-limiting embodiments, processing module 310 may communicate wireless devices for providing users with access to account information, quoting, illustrations, statements, or to initiate transactions during related to contract initiation, distribution, modification and/or payout. Further, processing module 310 may communicate with home based devices for alternative access to account information.

The communication module 320 may include multiple communication channels for simultaneous communication with, for example, other processing module 310, servers or client terminals. As stated, devices in communication with each other need not be continually transmitting to each other. On the contrary, such devices need only transmit to each other as necessary, may actually refrain from exchanging data most of the time and may require several steps to be performed to establish a communication link between the devices.

The processing module 310 also is in communication with a data storage module 340. The data storage module 340 may comprise an appropriate combination of magnetic, optical and/or semiconductor memory, and may include, for example, RAM, ROM, flash drive, an optical disc such as a compact disc and/or a hard disk or drive. The processing module 310 and the data storage module 340 each may be, for example, located entirely within a single computer or other computing device. Furthermore, the processing module 310 and the data storage module 340 each may be connected to each other by a communication medium, such as a USB port, serial port cable, a coaxial cable, an Ethernet type cable, a telephone line, a radio frequency transceiver or other similar wireless or wire line medium or combination of the foregoing.

The data storage module 340 may store, for example, (i) a program (e.g. computer program code and/or a computer program product) adapted to direct the processing module 310 in accordance with the present invention, and particularly in accordance with the processes described in detail hereinafter with regard to the processing module 310; (ii) a database adapted to store information that may be utilized to store information required by the program. The data storage module 340 includes multiple records; each record includes fields that are specific to the present invention such as payout scenarios, payout schedules, commencement date, commutation amounts, payment increase amounts, purchaser/participants' names, date change information, etc. The program may be stored, for example, in a compressed, an uncompiled and/or an encrypted format, and may include computer program code. The instructions of the program may be read into a main memory of the processing module 310 from a computer-readable medium other than the data storage module 340, such as from a ROM or from a RAM such as in memory module 330. While execution of sequences of instructions in the program causes the processing module 310 to perform the process steps described herein, hard-wired circuitry may be used in place of, or in combination with, software instructions for implementation of the processes of the present invention.

Thus, embodiments of the present invention are not limited to any specific combination of hardware and software.

Suitable computer program code may be provided for performing numerous functions as described above and configured to run with system 300. The functions described above are merely exemplary and should not be considered exhaustive of the type of functions that may be performed by the computer program code of the present inventions.

In the preferred embodiment, all of the modules described herein are operably inter-connected via a central communications bus 350. The communications bus 350 is able to receive information from each of the modules, as well as to transmit information from one module to another. The system 300 further includes a display module 360, and a reporting module 370.

The system 300 additionally includes a payout module 380 for making payments to participants according to the payout schedules of the present invention. In other non-limiting embodiments, the payout process may be an "electronic money card" for distributions/payments, a signal which authorizes electronic payment or direct deposit or a physical check to be printed and sent to a purchaser.

In the present invention, a number of annuity payout options may be processed and administered by the systems described herein in accordance with the present invention such Single Life Period Certain, Single Life Annuity, Single Life with Period Certain, Single Life Annuity with Cash Refund, Single Life Annuity with Installment Refund, Single Life Annuity with 25%, 50%, or 75% Return of Premium, Temporary Life Annuity, Joint Life Annuity, Joint and Survivor Life Annuity, Joint Life with Period Certain, Joint and Survivor Life with Period Certain, Joint Life Annuity with Cash Refund, Joint and Survivor Life Annuity with Cash Refund. Joint Life Annuity with Installment Refund, Joint Life Annuity with 25%, 50%, or 75% Return of Premium and Joint and Survivor Life Annuity with 25%, 50%, or 75% Return of Premium, which are further described below:

Single Life Period Certain—An annuity which provides for periodic payments during a specific period selected (the "Period Certain"), beginning on the annuity commencement date. If the annuitant dies before the end of the Period Certain, the insurance entity will pay the remaining periodic payments for the balance of the Period Certain. Payments cease at the end of the Period Certain regardless of whether the annuitant is still living.

Single Life Annuity—An annuity which provides for periodic payments for as long as the annuitant is alive, beginning on the annuity commencement date. Periodic payments cease with the last payment due prior to the death of the annuitant. If the annuitant dies within 30 days of the contract issue date, the insurance entity will pay an amount equal to the premium payment less any prior payments made. There is no death benefit after 30 days from the contract issue date, even if death occurs before the annuity commencement date and no payments have been made.

Single Life with Period Certain—An annuity which provides for periodic payments for as long as the annuitant is alive, beginning on the annuity commencement date. Periodic payments are guaranteed to continue at least for the Period Certain. If the annuitant dies before the end of the Period Certain, the insurance entity will pay the remaining periodic payments for the balance of the Period Certain. After the Period Certain, periodic payments cease with the last payment due prior to the death of the annuitant.

Single Life Annuity with Cash Refund—An annuity which provides for periodic payments for as long as the annuitant is alive, beginning on the annuity commencement date. Periodic payments cease with the last payment due prior to the death of the annuitant, and the insurance entity will pay the cash refund death benefit, if any. The amount of the cash refund death benefit will be a lump sum equal to the premium payment less the total amount of any prior payments made. If the sum of all payments the insurance entity makes prior to the death of the annuitant equals or exceeds the premium payment, no cash refund will be paid.

Single Life Annuity with Installment Refund—An annuity which provides for periodic payments for as long as the annuitant is alive, beginning on the annuity commencement date. Periodic payments cease with the last payment due prior to the death of the annuitant, and the insurance entity will pay an installment refund death benefit, if any. The installment refund death benefit will be a continuation of periodic payments in the amount and frequency of the annuity payment until the sum of all payments the insurance entity makes equals the premium payment. If the sum of all payments the insurance entity makes prior to the death of the annuitant equals or exceeds the premium payment, no further amounts will be paid.

Single Life Annuity with 25%, 50%, or 75% Return of Premium—An annuity which provides for periodic payments for as long as the annuitant is alive, beginning on the annuity commencement date. Periodic payments cease with the last payment due prior to the death of the annuitant, and the insurance entity will pay an amount equal to a percentage of the premium payment based on the selection at issue, with no reduction for prior payments made. Note that in certain situations where an Owner dies prior to the annuity commencement date, applicable tax rules may require that the insurance entity pay the Beneficiary a lump sum cash amount equal to the present value of the deferred installment refund annuity Payout that would be payable beginning on the annuity commencement date. In this event, the Beneficiary will not receive the full premium back because the insurance entity is required to commute the installment refund annuity payments.

Temporary Life Annuity—An annuity which provides for periodic payments during a specified period selected (the "Temporary Life Period"), provided the annuitant is alive, beginning on the annuity commencement date. All annuity payments cease upon the earlier of the last payment due prior to the death of the annuitant and the end of the selected Temporary Life Period. If the annuitant dies within 30 days of the contract issue date, the insurance entity will pay an amount equal to the premium payment less any prior payments made. There is no death benefit after 30 days from the contract issue date, even if death occurs before the annuity commencement date and no payments have been made.

Joint Life Annuity—An annuity which provides for periodic payments for as long as either the annuitant or the joint annuitant is alive, beginning on the annuity commencement date. Upon the death of either the annuitant or the joint annuitant, periodic payments will continue at 50%, 66⅔%, 75%, or 100% of the scheduled annuity payment (depending upon the percentage chosen when the contract is purchased) for as long as the surviving annuitant is alive. Periodic payments cease with the last payment due prior to the death of the survivor of the annuitant and the joint annuitant. If both annuitants die within 30 days of the contract issue date, the insurance entity will pay an amount equal to the premium payment less any prior payments made. There is no death benefit after 30 days from the contract issue date, even if death occurs before the annuity commencement date and no payments have been made.

Joint and Survivor Life Annuity—An annuity which provides for periodic payments for as long as either the annuitant or the joint annuitant is alive, beginning on the annuity commencement date. Upon the death of the joint annuitant while the annuitant is still living, periodic payments equal to the original annuity payment will continue for as long as the annuitant is alive. Upon the death of the annuitant while the joint annuitant is still living, periodic payments continue at 50%, 66⅔%, 75%, or 100% of the scheduled annuity payment (depending upon the percentage chosen when the contract is purchased) for as long as the joint annuitant is alive. Periodic payments cease with the last payment due prior to the death of the survivor of the annuitant and the joint annuitant. If both annuitants die within 30 days of the contract issue date, the insurance entity will pay an amount equal to the premium payment less any prior payments made. There is no death benefit after 30 days from the contract issue date, even if death occurs before the annuity commencement date and no payments have been made.

Joint Life with Period Certain—An annuity which provides for periodic payments for as long as either the annuitant or the joint annuitant is alive, beginning on the annuity commencement date. Periodic payments equal to the original scheduled annuity payment are guaranteed to continue for at least the Period Certain. Upon the death of either the annuitant or the joint annuitant, payments continue at 50%, 66⅔%, 75%, or 100% of the original scheduled annuity payment (depending upon the percentage chosen when the contract is purchased) after the expiration of the Period Certain. If both the annuitant and the joint annuitant die before the end of the Period Certain, the insurance entity will pay any remaining periodic payments for the balance of the Period Certain. After the Period Certain, periodic payments cease with the last payment due prior to the death of the survivor of the annuitant and the joint annuitant.

Joint and Survivor Life with Period Certain—An annuity which provides for periodic payments for as long as either the annuitant or the joint annuitant is alive, beginning on the annuity commencement date. Periodic payments equal to the original scheduled annuity payment are guaranteed to continue for at least the Period Certain. Upon the death of the joint annuitant with the annuitant living, periodic payments equal to the original annuity payment will continue as long as the annuitant is alive. Upon the death of the annuitant while the joint annuitant is still living, periodic payments will continue at 50%, 66⅔%, 75%, or 100% of the original scheduled annuity payment (depending upon the percentage chosen when the contract is purchased) after the expiration of the Period Certain. If both the annuitant and the joint annuitant die before the end of the Period Certain, the insurance entity will pay any remaining periodic payments for the balance of the Period Certain. After the Period Certain, periodic payments cease with the last payment due prior to the death of the survivor of the annuitant and the joint annuitant.

Joint Life Annuity with Cash Refund—An annuity which provides for periodic payments for as long as either the annuitant or the joint annuitant is alive, beginning on the annuity commencement date. Upon the death of either the annuitant or the joint annuitant, periodic payments continue at 50%, 66⅔%, 75%, or 100% of the original scheduled annuity payment (depending upon the percentage chosen when the contract is purchased). Periodic payments cease with the last payment due prior to the death of the survivor of the annuitant and the joint annuitant, and the insurance entity will pay the cash refund death benefit, if any. The amount of the cash refund death benefit will be a lump sum equal to the premium payment less the total amount of any prior payments made. If the sum of all payments the insurance entity makes prior to the death of the annuitant and joint annuitant equals or exceeds the premium payment, no cash refund will be paid.

Joint and Survivor Life Annuity with Cash Refund—An annuity which provides for periodic payments for as long as either the annuitant or the joint annuitant is alive, beginning on the annuity commencement date. Upon the death of the joint annuitant while the annuitant is still alive, periodic payments equal to the original annuity payment will continue for as long as the annuitant is alive. Upon the death of the annuitant while the joint annuitant is still living, periodic payments continue at 50%, 66⅔%, 75%, or 100% of the original scheduled annuity payment (depending upon the percentage chosen when the contract is purchased) for as long as the joint annuitant is alive. Periodic payments cease with the last payment due prior to the death of the survivor of the annuitant and the joint annuitant, and the insurance entity will pay the cash refund death benefit, if any. The amount of the cash refund death benefit will be a lump sum equal to the premium payment less the total amount of any prior payments made. If the sum of all payments the insurance entity makes prior to the death of the annuitant and joint annuitant equals or exceeds the premium payment, no Cash Refund will be paid.

Joint Life Annuity with Installment Refund—An annuity which provides for periodic payments for as long as either the annuitant or the joint annuitant is alive, beginning on the annuity commencement date. Upon the death of either the annuitant or the joint annuitant, periodic payments continue at 50%, 66⅔%, 75%, or 100% of the original scheduled annuity payment (depending upon the percentage chosen when the contract is purchased). Periodic payments cease with the last payment due prior to the death of the survivor of the annuitant and the joint annuitant, and the insurance entity will pay the installment refund death benefit, if any. The installment refund death benefit will be a continuation of periodic payments in the amount and frequency of the annuity payment until the sum of all payments the insurance entity makes equals the premium payment. If the sum of all payments the insurance entity makes prior to the death of the annuitant and joint annuitant equals or exceeds the premium payment, no further amounts will be paid.

Joint and Survivor Life annuity with Installment Refund—An annuity which provides for periodic payments for as long as either the annuitant or the joint annuitant is alive, beginning on the annuity commencement date. Upon the death of the joint annuitant with the annuitant still living, periodic payments equal to the original annuity payment will continue for as long as the annuitant is alive. Upon the death of the annuitant with the joint annuitant still living, periodic payments continue at 50%, 66⅔%, 75%, or 100% of the scheduled annuity payment (depending upon the percentage chosen when the contract is purchased). Periodic payments cease with the last payment due prior to the death of the survivor of the annuitant and the joint annuitant, and the insurance entity will pay the installment refund death benefit, if any. The installment refund death benefit will be a continuation of periodic payments in the amount and frequency of the annuity payment until the sum of all payments the insurance entity makes equals the premium payment. If the sum of all payments the insurance entity makes prior to the death of the annuitant and joint annuitant equals or exceeds the premium payment, no further amounts will be paid.

Joint Life Annuity with 25%, 50%, or 75% Return of Premium—An annuity which provides for periodic payments for as long as either the annuitant or the joint annuitant is alive, beginning on the annuity commencement date. Upon the death of either the annuitant or the joint annuitant, periodic payments continue at 50%, 66⅔%, 75%, or 100% of the original scheduled annuity payment (depending upon the percentage chosen when the contract is purchased). Periodic payments cease with the last payment due prior to the death of the survivor of the annuitant and the joint annuitant, and the insurance entity will pay an amount equal to a percentage of the premium payment based on the selection at issue, with no reduction for prior payments made.

Joint and Survivor Life Annuity with 25%, 50%, or 75% Return of Premium—An annuity which provides for periodic payments for as long as either the annuitant or the joint annuitant is alive, beginning on the annuity commencement date. Upon the death of the joint annuitant while the annuitant is still living, periodic payments equal to the original annuity payment will continue for as long as the annuitant is alive. Upon the death of the annuitant while the joint annuitant is still living, periodic payments continue at 50%, 66⅔%, 75%, or 100% of the original scheduled annuity payment (depending upon the percentage chosen when the contract is purchased) for as long as the joint annuitant is alive. Periodic payments cease with the last payment due prior to the death of the survivor of the annuitant and the joint annuitant, and the insurance entity will pay an amount equal to a percentage of the premium payment based on the selection at issue, with no reduction for prior payments made.

Referring still to FIG. 3, the system further comprises a risk assessment module 390 for assessing the risks associated with investing in a given investment vehicle. Furthermore, the system comprises an analysis module 314 for analysis of the behavior of a given investment vehicle.

Additionally, the system 300 includes a text data input module 392 for inputting data in the form of text, and a data entry module 394 for converting documents and images to digital format and inputting them into the system 300, an audio data input/output module 396 for outputting data in audio format (i.e. recorded speech, synthetically generated speech from digital text, or similar type of speech), a universal serial bus interface module 397 for receiving and transmitting data to and from devices capable of establishing a universal serial bus connection, and a digital data input interface module 398 for receiving data.

The term "computer-readable medium" as used herein refers to any medium that provides or participates in providing instructions to the processor of the computing device (or any other processor of a device described herein) for execution. Such a medium may take many forms, including but not limited to, non-volatile media, volatile media and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem.

Servers of the present invention may also interact and/or control one or more user devices or terminals. The user device or terminal may include any one or a combination of a personal computer, a mouse, a keyboard, a computer display, a touch screen, an LCD, voice recognition software or any other device generally represented by input/output devices required to implement the above functionality. The program also may include program elements such as an operating system, a database management system and "device drivers" that allow the processing module 318 to interface with computer peripheral devices (e.g. a video display, a keyboard, a computer mouse, etc).

Figure 4:
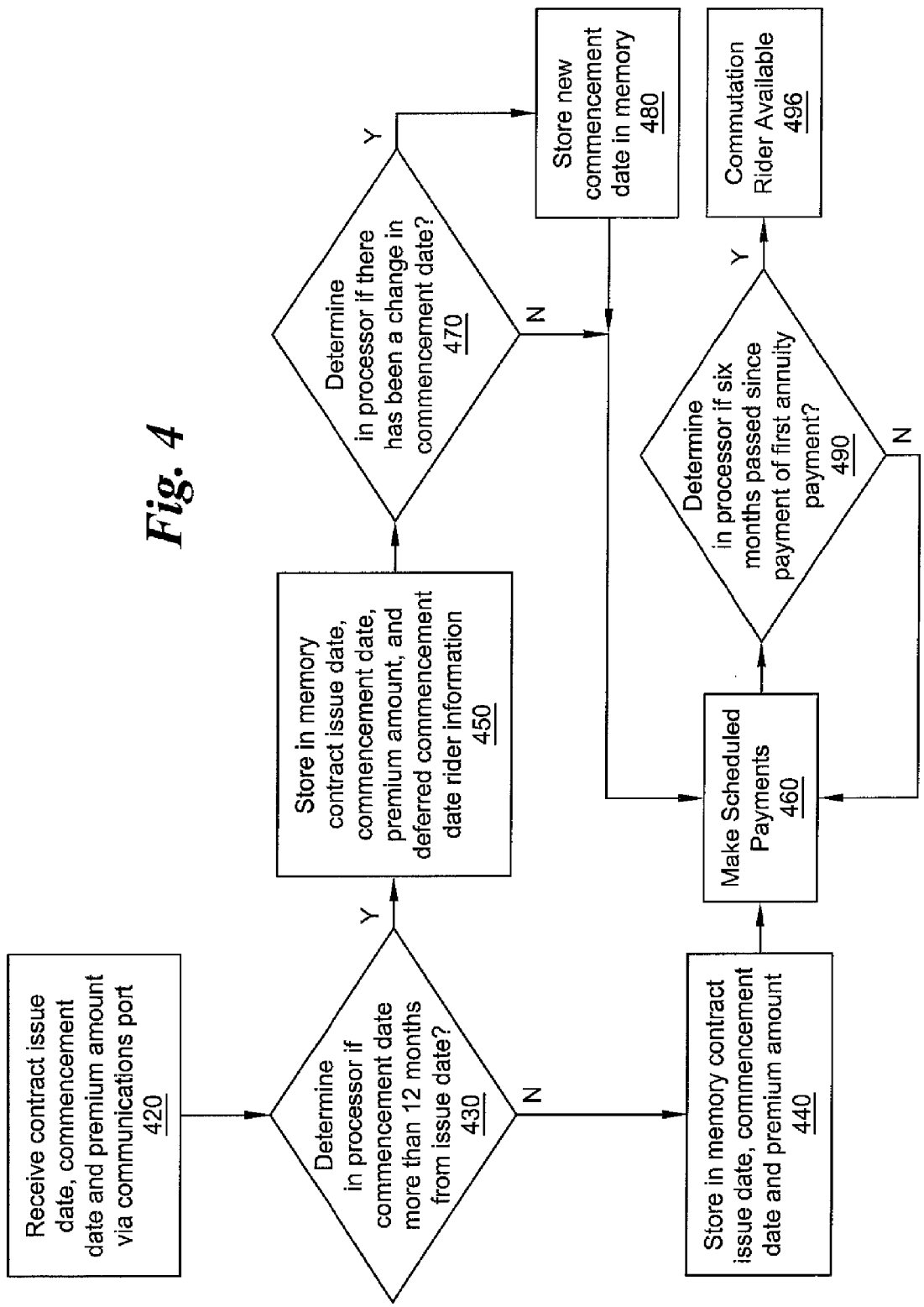
FIG. 4 depicts a flow chart of a financial services computerized process of the present invention.

FIG. 4 is a flow chart which illustrates a computerized method of practicing the present invention. Particularly, FIG. 4 is an illustrative embodiment of the steps that are taken to administer a guaranteed income annuity contract having immediate and deferred payout options in a single product. In one implementation, the present process may be performed using the system of FIGS. 1-3. Accordingly, referring to FIG. 4 and with further reference to the computer system of FIGS. 1-3, a method proceeds within a server by receiving at least a contract issue date, an annuity commencement date and a premium amount via a communications port 420. A processor determines if the annuity commencement date is more than 12 months from the contract issue date 430. If the annuity commencement date is not more than 12 months from the contract issue date, the contract issue date, commencement date and premium amount are stored in a memory 440. Scheduled payments are then made, 460 in accordance with a predetermined payment schedule. If the annuity commencement date is more than 12 months from the contract issue date, the contract issue date, the annuity commencement date, premium amount, and deferred commencement date rider information are stored in a memory 450. Once stored, the processor determines if there been a change in annuity commencement date 470. The change in annuity commencement date may be made via an optional annuity commencement date change rider as shown and described with reference to FIG. 2. The annuity commencement date change rider is generally available for certain annuity benefit forms (period certain life/joint life with period certain, life/joint life with cash refund and life/joint life with installment refund) at no extra premium only if the annuity commencement date is deferred more than one year from the contact issue date Referring back to FIG. 4, if there is a change to the annuity commencement date, then the new annuity commencement date is stored in the memory 480. If there is no change in annuity commencement date, then scheduled payments are made 460. Once payments have been started, the processor performs a commutation option qualification determination. By way of example, the processor determines if more than a commutation rider waiting period, which is six months in this embodiment, has passed since payment of first annuity payment 490, i.e., since the annuity commencement date. If more than six months has passed, then a commutation rider is made available 496. If more than six months have not passed, then the scheduled payments are continued 460.

As discussed with reference to FIG. 4, an optional commutation rider may be made available to the purchaser or contract owner, 496. The commutation rider may give the contract owner an option to fully or partially commute the remaining period certain annuity payments and may be requested after the expiration of the commutation rider deferral period after the annuity payment commencement date. The commutation rider deferral period may be six months or a different period of time. As such, this rider may only be made available with period certain payout options. The commutation rider permits the contract owner to request a lump sum commutation amount, which may be equal to the full present value, based on discount rate assumptions set forth in the rider, of all remaining guaranteed annuity payments. Alternatively, the contract owner may request to commute a percentage of the present value of all remaining guaranteed annuity payments (i.e., the remaining period certain annuity payments). The predetermined percentage may be based on, in a non-limiting example, Moody's Long-Term Composite Corporate Bond Yield Average. However, in a non-limiting example, the contract owner may not commute a specified number of remaining guaranteed annuity payments. As a non-limiting example, annuitant may not commute the next ten period certain annuity payments. The following non-limiting example illustrates the application of commutation rider. Assuming a payment option selected of Life with 10-Year Period Certain; $3,000 per month, an annuity commencement date: Aug. 1, 2008; a date of commutation request: Aug. 1, 2010; commutation request: lump sum of $137,000, which equates to 60% of the present value of the remaining period certain payments. The lump sum calculation is based on the Moody's Long-Term Composite Corporate Bond Yield Average as of the month preceding the commutation request. In this example, the rate used is 6.20%.

In this example, the contract owner may receive a lump sum equal to the commuted value, and then receive a proportionally reduced (i.e., payments reduced by 60%) annuity payment for the rest of the 10-year period certain ($1,200 per month or 40% of the original annuity payment). If the annuitant is still living at the end of the period certain, the annuity payments would increase to the original $3,000 per month for the rest of the life of the annuitant. The amount of the lump sum received when the contract owner commutes all or a percentage of the remaining period certain annuity payments will be equal to the present value of the period certain annuity payments (or portion thereof) on the date that the provider receives contract owners request to commute. The present value will be determined by discounting each commuted certain period payment to the date provider receives the commutation request using the Moody's Long-Term Composite Corporate Bond Yield Average as of the end of the month preceding the date of the request, plus a rate Adjustment that is determined when the contract was purchased. For example, if the applicable Moody's Long-Term Composite Corporate Bond Yield Average at the end of the prior month is 5.50% and the rate adjustment specified in the contract is 0.50%, each commuted payment will be discounted at 6% to calculate the present value of the commuted annuity payments. In the event that the Moody's Long-Term Composite Corporate Bond Yield Average is not available, its successor average or index will be utilized.

Figure 5:
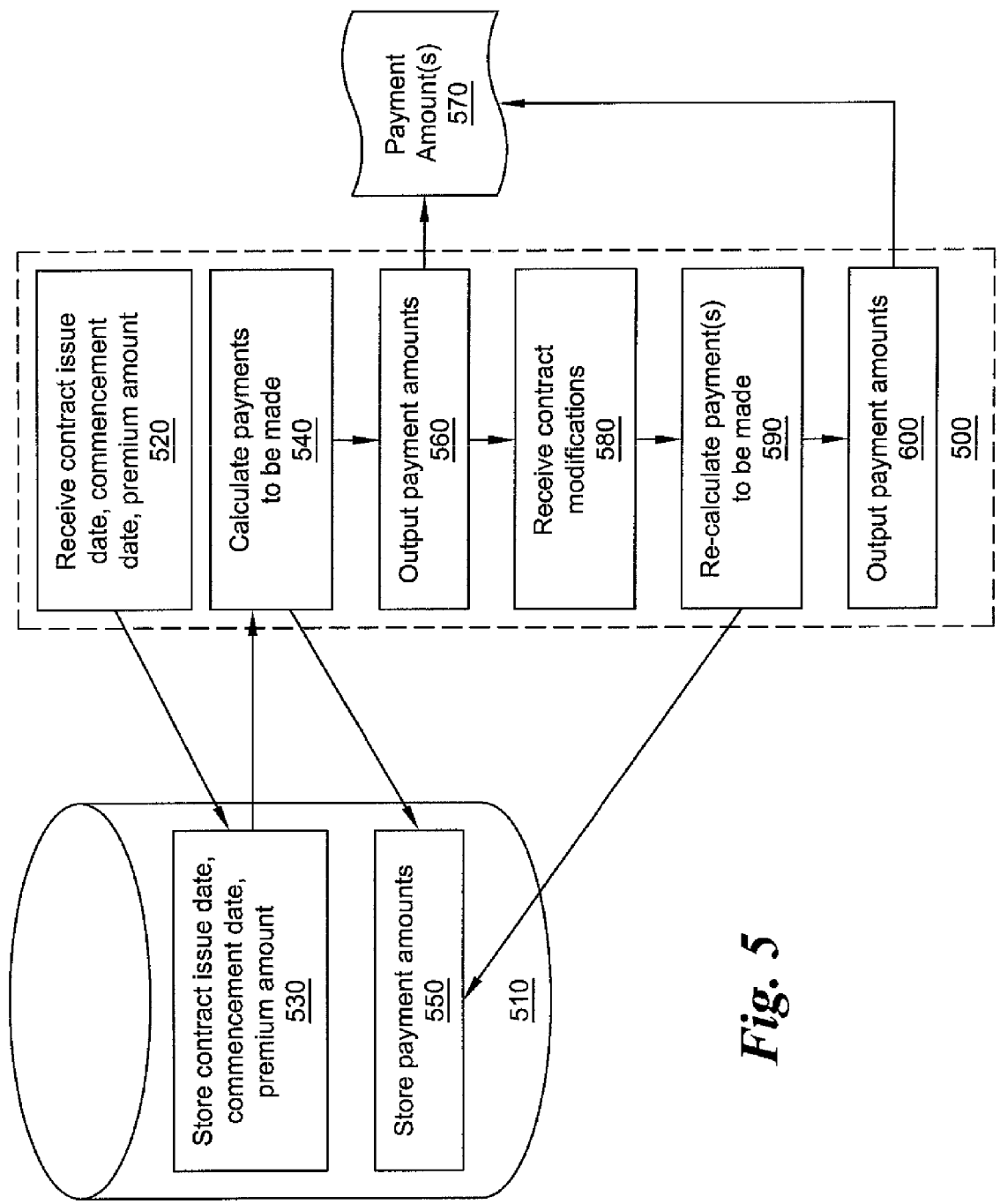
FIG. 5 depicts a flow chart of an embodiment of a computer implemented financial services process of the present invention.

Referring to FIG. 5, another embodiment of a computer implemented method of the present invention is shown. The steps described may be implemented in a computer processor 500 which is in communication with a memory, such as data storage 510. Processor 500 is adapted to receive information regarding a financial product, such as a novel guaranteed income product which may include at least a contract issue date, an annuity commencement date and a premium amount, 520. The received contract issue date, annuity commencement date and premium amount are stored, 530. Processor 500 calculates payments to be made given the stored contract issue date, annuity commencement date and premium amount, 540. The calculated payment amounts are also stored, 550. The payment amounts are also output 560, in a physical, visual or electronic manner, 570. Such output may be in the form of electronic signals for visual representation on a screen, a web page transmitted to an output device, a physical printout from a printer indicating a payout amount or payment stream projection, an indication or instruction for payment such as an order for payment to a bank or other financial institution, or an audio message all of which may be indicating at least the payment calculation amount(s).

Referring back to FIG. 5, one or more contract modifications may be received 580, such as a change in annuity commencement date or a commutation election such as may be available during the term of the contract being administered. Based on the contract modification(s), a recalculation of the payments may be made, 590 and stored. The payment amounts may thus be dynamically adjusted based on changes in the annuity commencement date. Once recalculated, the new payment amounts may be outputted, 600 as discussed above. This method provides purchasers with never before available flexibility and comprehensiveness in these retirement strategies. By combining traditionally separate immediate and deferred income annuities with a variety of payment options in a single product, the present invention provides many tangible benefits to purchasers and to the selling agent.

For example, purchasers will have unprecedented flexibility for income planning with the ability to respond to changing economic and personal situations. Purchasers and providers will also substantially benefit from ease of administration. Providers can market a single product instead of two separate products to consumers. Providers can further streamline purchaser information databases by utilizing a single dataset for both the immediate and deferred payout streams.

While the present invention has been described with reference to the preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A computer system for administering a guaranteed income annuity having immediate and deferred payout options in a single guaranteed income product comprising:
   a communications port adapted to receive information relating to the immediate and deferred payout options in the single product, wherein the information includes at least a contract issue date, an annuity commencement date and an amount of an initial premium;
   a processor coupled to the communications port, the processor adapted to process the information including at least the contract issue date, the annuity commencement date and the amount of the initial premium;
   a memory in communication with the processor, the memory adapted to store the contract issue date, the commencement date and the amount of the initial premium;
   the processor further adapted to determine one or more payment amounts based on the stored contract issue date, commencement date and the amount of the initial premium;
   the memory further adapted to store the determined payment amounts; and
   the processor further adapted to provide an output signal indicative of instructions for one or more payments to be made based on the stored payment amounts, wherein the payments have immediate or deferred payout options arising out of the single guaranteed income product expressed as an immediate base contract form and a deferred rider coupled to the immediate base contract form.

2. The system of claim 1 wherein the processor is further adapted to process a change to the annuity commencement date and the memory is further adapted to store the changed annuity commencement date provided the deferred payout option is selected, wherein the payment amounts are dynamically adjusted in response to the change in the commencement date.

3. The system of claim 2, wherein the processor is adapted to receive commutation instructions provided at least six payments have been made under the single guaranteed income product.

4. The system of claim 3, wherein the processor further makes a commutation option qualification determination and calculates a commutation amount for payment.

5. The system of claim 1, further comprising a display component for providing a visual representation of the immediate and deferred payment options in the single guaranteed income product.

6. A dynamic financial processing system for administering a financial product having both immediate and deferred payment options associated with a single payment contract comprising:
at least one agent computer configured for processing the immediate and deferred payment options associated with the single payment contract; the at least one agent computer further configured for modeling a plurality of immediate and deferred payment options in the single payment contract based on at least in part on a contract issue date, a annuity commencement date, a premium amount and a payout rate associated with the single payment contract, wherein the annuity commencement date can vary from an immediate to a deferred option within the single payment contract; and
at least one server computer in communication with the at least one agent computer, the server configured for administering the immediate and deferred payment options associated with the single payment contract, wherein the server is configured for dynamically calculating and establishing payments based on the immediate and deferred payment options in the single payment contract, the payments being based at least in part on the contract issue date, the annuity commencement date, the premium amount and the payout rate, the immediate payout option offering a payout stream less than one year from the contract issue date and the deferred payment option offering a increased payout stream more than one year from the contract issue date, both the immediate payout and deferred payout streams being made available in the single payment contract.

7. The system of claim 6, wherein the server computer includes one or more data storage modules for storing payout contract payment schedules which may be either immediate or deferred arising out of the single payment contract.

8. The system of claim 7, wherein said server computer is configured for calculating an annuity commencement date change rider.

9. The system of claim 8, wherein said annuity commencement date change rider changes said annuity commencement date for the deferred payment option.

10. The system of claim 9, wherein said server is configured to provide a return of premium option.

11. The system of claim 9, further comprising a display component for providing a visual representation of the immediate and deferred payment options in the single payment contract.

12. The system of claim 11, further comprising said computer for calculating a commutation rider, wherein said commutation rider commutes remaining payments in the deferred payout stream.

13. A computer implemented method for administering a fixed payout annuity product having immediate and deferred options available in a single contract, the method comprising the steps of:
receiving, via an electronic communication device, information for the fixed payout annuity product having immediate and deferred options, the information including an annuity commencement date from a selection of both immediate and deferred options in a single contract, an issue date, annuitant information and an annuity payment amount;
storing in a storage device, the annuity commencement date, the issue date, the annuitant information and the annuity payment amount;
calculating in a computer central processing unit, amounts of payments in a stream of guaranteed periodic annuity payments based on the stored annuity commencement date, the issue date and the annuity payment amount; and
generating indicia indicative of payment based on the calculated payment amounts, the payment amount reflecting an immediate or a deferred payout scenario arising out of the single contract.

14. The computer implemented method of claim 13, further comprising the step of calculating, via the computer central processing unit, an annuity commencement date change rider.

15. The computer implemented method of claim 14, wherein the annuity commencement date change rider changes the annuity commencement date for storage in the storage device.

16. The computer implemented method of claim 15, wherein the computer central processing unit makes the annuity commencement date change rider available no earlier than one year from the issue date.

17. The computer implemented method of claim 16, further comprising: receiving via the electronic communication device indicia related to a payment increase.

18. The computer implemented method of claim 17, further comprising the step of calculating, via the computer, a commutation rider, wherein the commutation rider commutes a remainder of the guaranteed periodic annuity payments.

19. The computer implemented method of claim 13, wherein the contract comprises a base immediate contract and a deferred rider.

20. The computer implemented method of claim 13, wherein the annuity payments are selected from the group consisting of: Single Life Period Certain, Single Life Annuity, Single Life with Period Certain, Single Life Annuity with Cash Refund, Single Life Annuity with Installment Refund, Single Life Annuity with 25%, 50%, or 75% Return of Premium, Temporary Life Annuity, Joint Life Annuity, Joint and Survivor Life Annuity, Joint Life with Period Certain, Joint and Survivor Life with Period Certain, Joint Life Annuity with Cash Refund, Joint and Survivor Life Annuity with Cash Refund, Joint Life Annuity with Installment Refund, Joint Life Annuity with 25%, 50%, or 75% Return of Premium and Joint and Survivor Life Annuity with 25%, 50%, or 75% Return of Premium.

* * * * *